US006508352B1

(12) United States Patent
Enenkel et al.

(10) Patent No.: US 6,508,352 B1
(45) Date of Patent: Jan. 21, 2003

(54) DEVICE AND METHOD FOR PRODUCING, PORTIONING AND RELOADING A STACK

(75) Inventors: Peter Enenkel, Constance (DE); Armin Zimmermann, Constance (DE); Dirk Nolte, Offenburg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/857,597

(22) PCT Filed: Dec. 6, 1999

(86) PCT No.: PCT/DE99/03898

§ 371 (c)(1),
(2), (4) Date: Jul. 27, 2001

(87) PCT Pub. No.: WO00/34166

PCT Pub. Date: Jun. 15, 2000

(30) Foreign Application Priority Data

Dec. 9, 1998 (DE) ........................................ 198 56 837

(51) Int. Cl.[7] ................................................ B65G 47/26
(52) U.S. Cl. ....................... 198/419.1; 414/788; 53/542
(58) Field of Search ................................ 271/147, 213, 271/214; 53/535, 542; 198/419.1, 418.7; 414/788, 790.2, 790.6

(56) References Cited

U.S. PATENT DOCUMENTS 4,162,870 A * 7/1979 Storm ......................... 53/542
5,104,114 A 4/1992 Gillmann .................... 271/181

FOREIGN PATENT DOCUMENTS

| | | | |
|---|---|---|---|
| DE | 2 419 630 | 11/1974 | B65H/31/06 |
| DE | 3244013 | * 7/1983 | 198/419.1 |
| DE | 3423479 A1 | 3/1985 | B65G/59/02 |
| EP | 0 513 732 A1 | 5/1992 | B07C/1/02 |
| EP | 0 559 553 A1 | 3/1993 | B65H/31/06 |
| FR | 2 680 121 | 8/1991 | B07C/1/00 |
| GB | 1 466 892 | 7/1974 | B65H/33/08 |
| JP | 52042798 | 4/1977 | B65H/29/12 |

* cited by examiner

*Primary Examiner*—H. Grant Skaggs
(74) *Attorney, Agent, or Firm*—Philip G. Meyers

(57) ABSTRACT

The stack of flat mail pieces that are arranged adjacent to one another on a support can be portioned with the aid of at least one displaceable holding support containing a conveyor belt because the support is divided into a horizontally oriented, stationary section and an adjacent section that can be pivoted about a pivoting axis positioned at the end of the pivotable section in the stacking direction. During the portioning process, the pivotable section extending downward at an angle from the stationary section is pivoted downward into a horizontal position. A holding support with a conveyor belt that is driven downward during the pivoting process is arranged underneath the stationary section at its border with the pivotable section. An additional support is arranged on the frame of the pivotable section of the support above the mail pieces. This additional support holds the stack remaining on the stationary section of the support. The portioned and subsequently compressed stack is positioned between the holding supports that contain conveyor belts and the stack is reloaded by driving these conveyor belts.

9 Claims, 2 Drawing Sheets

DEVICE AND METHOD FOR PRODUCING, PORTIONING AND RELOADING A STACK

DESCRIPTION

Figure 1A:
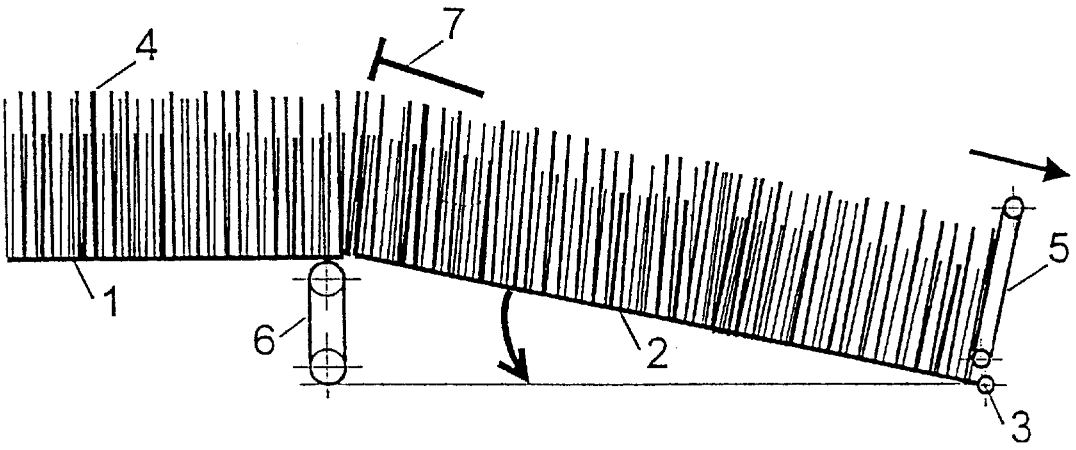

The invention pertains to a method and a device for producing, portioning and reloading a stack according to the preambles of the independent claims.

In processing and distribution processes, larger stacks of flat mail pieces arranged adjacent to one another in an upright fashion are frequently produced. These stacks must be portioned into smaller stacks for additional processing or transport in containers.

DE-OS 24 19 630 discloses a device that produces a stack of flat objects, e.g., letters and postcards, that are arranged in an upright fashion in order to provide an intermediate storage for the flat objects. U.S. Pat. No. 5,104,114 also describes a stacking device for producing stacks of flat mail pieces that are arranged in an upright fashion, wherein the stack is stacked against a displaceable supporting wall by a stacking roller. Stacking is done on the movable bottom of a container. GB-PS 14 66 892 describes the portioning of a stack of flat objects that are arranged in an upright fashion by pivoting a pivotable support section away from a stationary support section.

The process of transporting stacks without special containers is not described in these publications.

The invention disclosed in claims 1, 7 and 8 is based on the objective of automatically and reliably portioning a stack of thin mail pieces that are arranged adjacent to one another in an upright fashion on a support with a low stacking pressure between two displaceable holding supports, and of reliably reloading a compressed stack without requiring costly special containers for transporting the stacks.

According to the invention, the reliable and inexpensive portioning of the stacks and the loading of containers with the portioned stacks with a defined stacking pressure is guaranteed by a support consisting of a stationary arranged and horizontally oriented section and an adjacent pivotable section that extends downward at an angle during the filling of the support and that is pivoted downward into a horizontal position during the portioning process, as well as by the holding supports that vertically displace the mail pieces.

Advantageous embodiments are described in the subordinate claims.

According to claim 2, it is advantageous to realize the additional support for supporting the remaining stack in the form of a driven conveyor belt that is oriented perpendicular to the pivotable support, and to drive this conveyor belt when the pivotable section of the support is pivoted downward, such that no vertically directed force is exerted upon the mail pieces by the supporting belt surface. These measures prevent impermissible stresses on, in particular, sensitive mail pieces.

According to claim 3, it is advantageous to also realize the displaceable holding support on the pivotable section of the support in the form of a conveyor belt that can be driven. Due to this measure, it is possible to reliably transport the compressed and portioned stack in the direction of a container.

In order to make it possible to load the portioned stack into a container, claim 4 advantageously proposes to realize the pivotable section of the support such that it can be removed from the region of the portioned stack to the side.

According to claim 5, it is advantageous to arrange two longitudinal carriers that extend parallel to one another and that can be pivoted outward underneath the removable section of the support. A container that is open at the top and that contains side walls extending outward at an angle is situated underneath these longitudinal carriers.

According to claim 6, the container can be raised by means of a lifting mechanism. Due to this measure, it is possible to partially introduce the held and portioned stack into the container and then to pivot the longitudinal carriers to the side into the lateral space formed by the side walls extending outward at an angle. Consequently, it is ensured that the mail pieces are reliably transferred into the container.

Once the loading of the container is completed, the advantageous embodiment according to claim 9 lowers the container onto a transport element for transport, and moves the displaceable holding support against the remaining stack of mail pieces on the stationary section of the support. Then the moving section of the support is pivoted upward again and additional loading of the support is continued.

The invention is described in greater detail below with reference to one embodiment that is illustrated in the figures.

The figures show

Figure 1B:
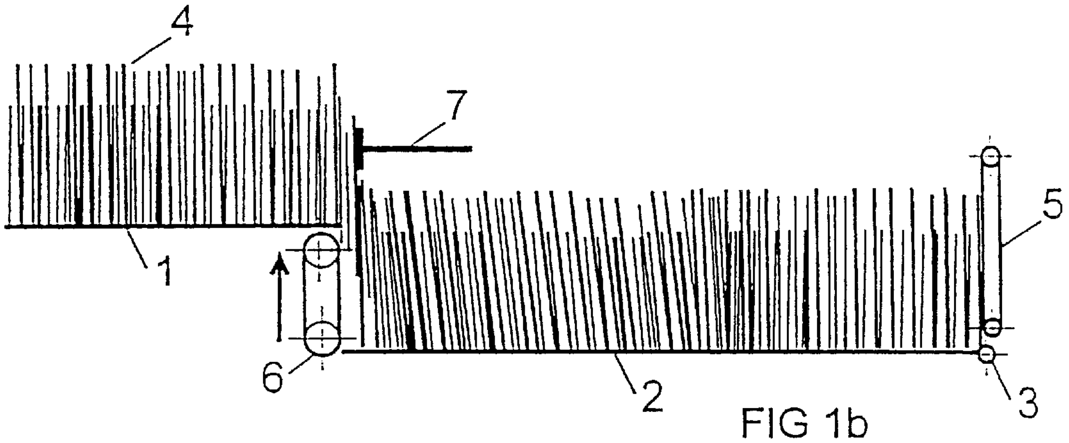
Figure 1C:
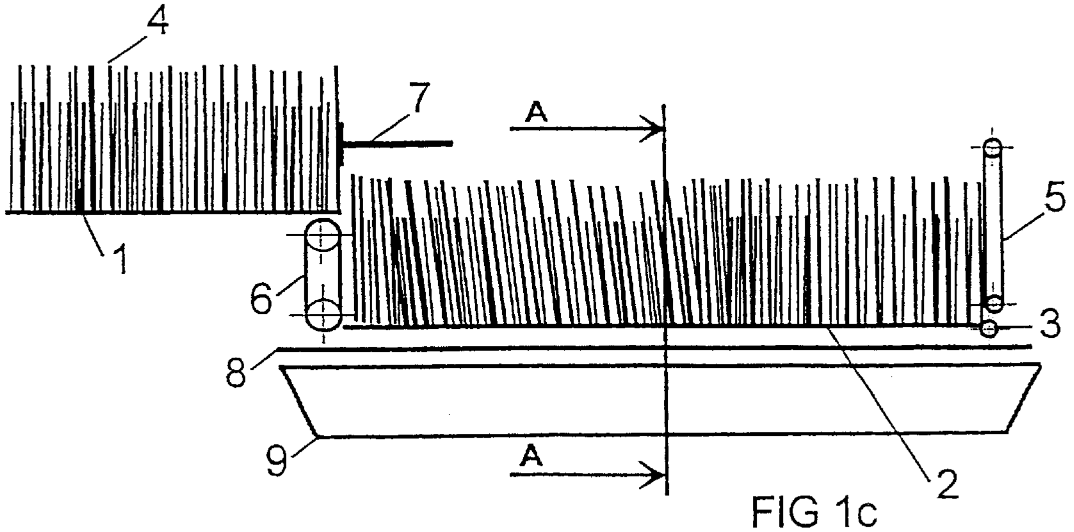

FIG. 1*a,* a schematic side view of the portioning device with a stack to be portioned before the support is pivoted downward;

FIG. 1*b*, a schematic side view shortly after the support is pivoted downward;

FIG. 1*c*, a schematic side view with a portioned and compressed stack and a container that is to be loaded with the stack, and FIGS. 2*a–e*, schematic representations according to the section along the line A—A in FIG. 1*c* of the processes that take place successively during the loading of the container.

FIG. 1 a shows a support consisting of a horizontally oriented, stationary section 1 and an adjacent section 2 that extends downward at an angle and that can be pivoted about a pivoting axis 3 located at the end of the support in the stacking direction. A stack 4 of flat mail pieces that are arranged adjacent to one another with a low stacking pressure is located on the support. One end of this stack is held by a displaceable holding support 5 that is realized in the form of conveyor belts.

The holding support 5 contains a sensor that measures the stacking pressure and the support is moved such that the predetermined stacking pressure is observed. The filling of the device is done from the left with a low stacking pressure. The stack 4 is formed of mail pieces from other containers which are supplied from the left side that is not shown in the figures. These mail pieces are removed from the respective containers and displaced in the direction of the mail pieces that are already arranged on the support. During this process, the mail pieces are held with horizontally displaceable and pivotable holding supports. One additional holding support 6 that is realized in the form of vertically oriented conveyor belts is located underneath the stationary section 1 at the border between the stationary section 1 and the pivoted section 2 of the support.

Once the entire stack 4 to be portioned is situated on the support, it is portioned by pivoting the pivotable section 2 downward about the pivoting axis 3 into a horizontally oriented position by means of a not-shown drive mechanism. During the pivoting process, the conveyor belts of the holding support 6 are driven downward. Due to this measure, small mail pieces cannot become stuck between the two stacks at the border between the upper remaining stack and the lower portioned stack. One additional support 7 is arranged on the pivotable section 2 of the support at the partition between the support sections 1, 2 such that this support is situated slightly above the highest mail pieces to be portioned in order to prevent the upper stack from tilting. When the pivotable section is pivoted downward, the additional support 7 is also moved downward such that it holds the remaining stack.

The additional support 7 may also contain conveyor belts. If the conveyor belts are driven upward with the pivoting speed during the pivoting movement, no forces with vertical components are exerted upon the mail pieces during this process. After the pivoting process is completed, the displaceable holding support 3 can be moved inward in order to produce a selected, higher stacking pressure (FIG. 1*c*).

Two longitudinal carriers 8 that can be pivoted outward are positioned underneath the support 2, with a container 9 that is open at the top and that has angled side walls positioned underneath the longitudinal carriers.

The reloading processes which take place successively are described in greater detail below with reference to the sectional representations of the figures.

Figure 2A:
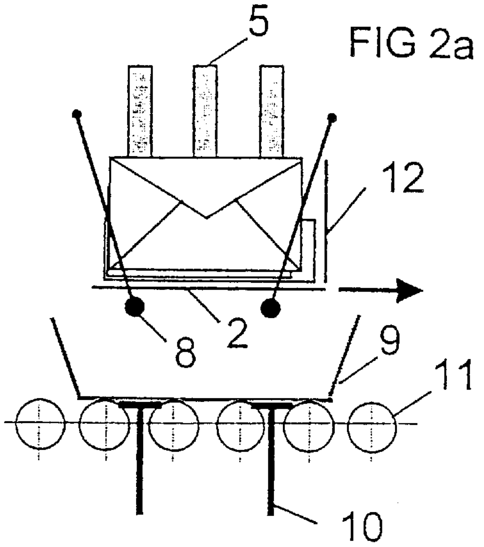
Figure 2B:
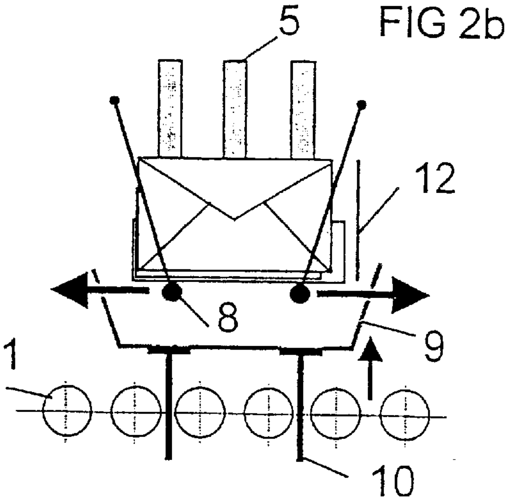
Figure 2C:
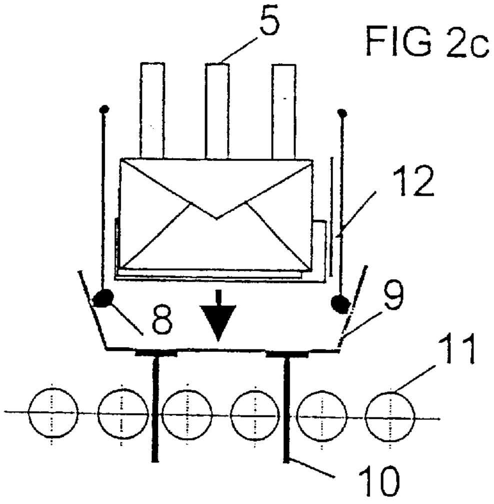
Figure 2D:
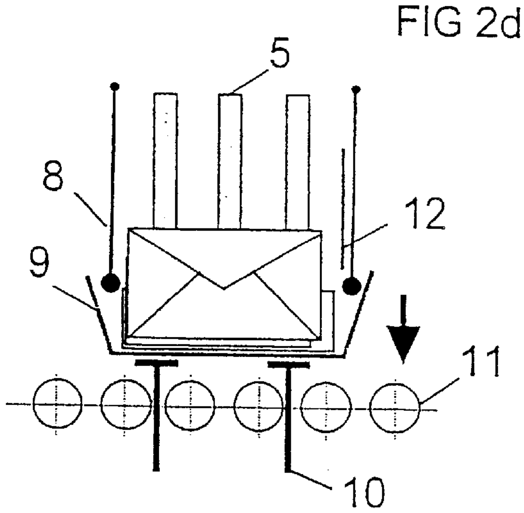
Figure 2E:
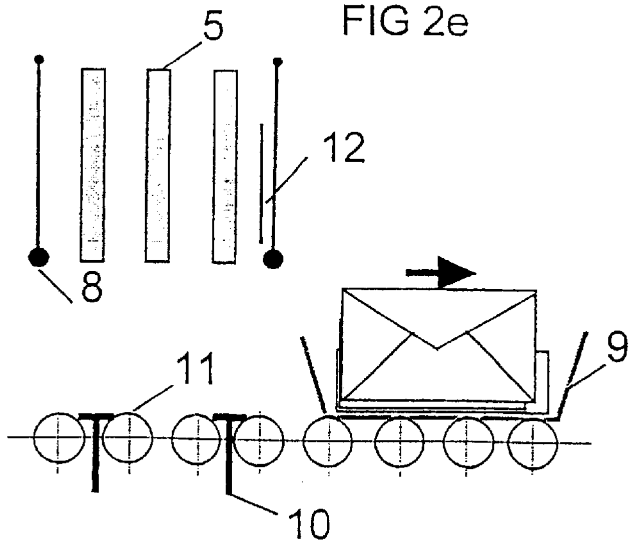

According to FIG. 2*a*, the support 2 is initially pulled out underneath the stack to the side, with the longitudinal carriers 8 being mounted in such a way that the removal of the support 2 is not impaired and the stack of mail pieces is held in its position by a limit stop 12. According to FIG. 2*b*, the container 9 is then lifted off a track of rollers 11 by means of a corresponding lifting mechanism 10 so that the longitudinal carriers 8 and the lower ends of the mail pieces are positioned underneath the upper edge of the side walls of the container 9. The longitudinal carriers (8) are then pivoted outward as indicated by the arrows. In the next phase (FIG. 2*c*), the conveyor belts of the holding supports 5, 6 holding the stack of mail pieces with a defined stacking pressure are driven in such a way that the stack is moved toward the bottom of the container. After the stack of mail pieces is positioned on the bottom of the container, the container 9 is lowered onto the track of rollers 11 with the aid of the lifting mechanism 10 (FIG. 2*d*) and the container is transported away on this track of rollers (FIG. 2*e*). The displaceable holding support 5 is moved against the remaining stack of mail pieces on the stationary section 1 of the support, the movable section 2 of the support is pivoted upward again, and additional loading of the support continues.

FIGS. 2*a*–*e* indicate that each holding support 5, 6 contains three conveyor belts. The length of the conveyor belts is realized such that the stack is reliably transported into the container 9.

Depending on the specific design, it may be necessary to move the holding supports 5, 6 upward such that the container 9 can be transported in an unobstructed fashion. If a stack is smaller than the volumetric capacity of the container 9 so that the mail pieces located in the container 9 are able to tilt, a holding arrangement that can be clamped onto the side walls of the container is inserted into the container 9. This holding arrangement is shaped such that the holding supports 5, 6 have sufficient space to move into the container 9.

What is claimed is:

1. Device for producing and portioning a stack of flat mail pieces that are arranged adjacent to one another in an upright fashion on a support with a low stacking pressure, containing at least one holding support that can be displaced in accordance with the predetermined stacking pressure, and containing a sensor that measures the stacking pressure, characterized by the fact that the support contains a horizontally oriented, stationary section and an adjacent section that can be pivoted between a stacking position and a separated position about a pivoting axis that is arranged on the end facing away from the stationary section, with the length of the pivotable section corresponding to the maximum length of a portioned stack, and with the pivotable section extending downward at an angle from the stationary section in its stacking position in order to form the stack and, after being pivoted about the pivoting axis, extending horizontally in the separated position in order to portion the stack, wherein one additional vertically oriented holding support that contains a conveyor belt device is arranged underneath the stationary section at the partition between the stationary section and the pivotable section, with said additional holding support serving for supporting the portioned stack on the pivotable section on its end facing the stationary section, and with the conveyor belt being driven downward at least during the pivoting of the pivotable section into its separated position, and wherein one additional support is mounted above the pivotable section at the partition between the stationary section and the pivotable section, with said additional support serving for supporting the portioned stack on the stationary section with its end facing the pivotable section.

2. Device according to claim 1, characterized by the fact that the additional support contains one or more vertically oriented conveyor belts that are driven in such a way that only a compressive force approximately perpendicular to the end surface of the additional support acts upon the portioned stack during the pivoting of the pivotable section.

3. Device according to claim 1, characterized by the fact that the displaceable holding support supporting the stack on the pivotable section with its end surface facing away from the stationary section is realized in the form of a driven conveyor belt that is oriented perpendicular to the support.

4. Device according to claim 1, characterized by the fact that the pivotable section of the support can be removed to the side from the region of the compressed stack of mail pieces located on the support.

5. Device according to claim 4, characterized by the fact that two longitudinal carriers which extend parallel to one another and which can be pivoted outward are arranged underneath the pivotable section that can be removed to the side, with a container with side walls that extend outward at an angle situated underneath said longitudinal carriers.

6. Device according to claim 5, characterized by the fact that the height of the container to be loaded can be adjusted by means of a lifting mechanism.

7. Method for producing and portioning a stack of flat mail pieces that are arranged adjacent to one another in an upright fashion on a support with a low stacking pressure, and for reloading a compressed and portioned stack into a container by means of the device according to claim 1, characterized by the fact that the container is arranged underneath the pivotable section of the support, the pivotable section is pivoted into its separated position once a stack is produced on the support, with the conveyor belt device of the additional holding support being driven in such a way that at least the mail pieces in contact with the conveyor belt device are transported toward the support, the separated and portioned stack positioned on the pivotable section is compressed to a predetermined stacking pressure by means of the displaceable holding support, the pivotable section is removed underneath the portioned stack to the side, with the portioned stack being prevented from lateral movement by a limit stop, the container is moved upward until the longitudinal carriers with the portioned stack are positioned within the container to such a degree that the longitudinal carriers can be pivoted underneath the portioned stack to the side, and the longitudinal carriers are pivoted underneath the portioned stack to the side, and then the conveyor belts of the holding support compressing the portioned stack and of the additional holding support are driven in such a way that the portioned stack is moved toward the bottom of the container.

8. Method according to claim 7, characterized by the fact that the container is lowered onto a transport means after being loaded, the longitudinal carriers are pivoted back into their operating position, the displaceable holding support is moved against the end of the stack remaining on the stationary section, and then the pivotable section is pivoted into its stacking position such that a new stack can be produced.

9. Device for reloading a compressed stack of flat mail pieces that are arranged adjacent to one another on a removable support between two holding supports, where at least one of these supports is displaceable, with at least one holding support containing a sensor that measures the stacking pressure, and with the holding supports being displaceable such that a predetermined stacking pressure is observed, characterized by the fact that the holding supports are realized in the form of conveyor belts that are oriented in the reloading direction and that can be driven.

* * * * *